United States Patent [19]
Esterson et al.

[11] Patent Number: 5,176,249
[45] Date of Patent: Jan. 5, 1993

[54] SINGLE FACETED ROUND BACK WIRE, OBLIQUE CRIMP CONNECTING ROD WOVEN WIRE CONVEYOR BELT

[75] Inventors: Christopher D. Esterson, Seaford, Del.; Conroy R. Marth, Preston; Peter K. Bailey, Easton, both of Md.; John D. Carduff, Salisbury, Md.

[73] Assignee: The Cambridge Wire Cloth Company, Cambridge, Md.

[21] Appl. No.: 652,987

[22] Filed: Feb. 8, 1991

[51] Int. Cl.⁵ .............................. B65G 17/06
[52] U.S. Cl. .................... 198/850; 198/848; 198/853
[58] Field of Search ............... 198/848, 850, 851, 852, 198/853

[56] References Cited

U.S. PATENT DOCUMENTS

| | | | |
|---|---|---|---|
| 2,885,164 | 5/1959 | Hooper | 198/850 X |
| 3,202,387 | 8/1965 | Andrews et al. | 198/848 X |
| 3,731,894 | 5/1973 | Curran et al. | 198/850 X |
| 4,345,730 | 8/1982 | Leuvelink | 198/853 X |
| 4,346,138 | 8/1982 | Lefferts | 198/853 X |

Primary Examiner—Joseph E. Valenza
Assistant Examiner—Tuan N. Nguyen
Attorney, Agent, or Firm—Cushman, Darby & Cushman

[57] ABSTRACT

Wire stock for connecting rods is run through the nip of a pair of obliquely toothed rolls having teeth which taper from one face of the roll towards the other, and have a larger radius at the tip than along the portions flanking the tip. The angle of obliqueness matches the angle that a turn of a spiral wire will traverse the connecting rod. Round wire stock for the single-faceted spiral wires is run through the nip of a pair of rolls one of which has a cylindrical surface (i.e., a flat longitudinal profile), and the other of which has a circumferential groove with a slightly larger diameter than the round wire stock. As the wire is flattened on one side, its curved side is broadened. As the resultingly single-faceted round wire is wound into flattened spiral form, it is spatially orientationally guided, so that the facet becomes located facing outwards. The rods and flat spirals are conventionally assembled with one another and secured to one another at respective ends, to provide a balanced flat spiral woven wire conveyor belt with rounds of turns nested in concave oblique crimp notches on the connecting rods.

3 Claims, 9 Drawing Sheets

SINGLE FACETED ROUND BACK WIRE, OBLIQUE CRIMP CONNECTING ROD WOVEN WIRE CONVEYOR BELT

BACKGROUND OF THE INVENTION

In a balanced woven wire conveyor belt, a longitudinally extending series of transversally extending spirals of wire, usually made of steel and steel alloys, is integrated into a longitudinally extending belt which is usually endless in the longitudinal direction, but has two transversally opposite, i.e., left and right, longitudinally running edges), by a longitudinally extending series of transversally extending rods, or bars also usually made of steel. In the series of spiral wires, alternate ones are spirally wound in a left-handed and right-handed spiraling sense and "skewered" in common on one rod, so that each spiral wire is skewered by two connecting rods, of which one leads and the other trails, assuming that the woven wire conveyor belt thereby constructed has a usual direction of advance in a longitudinal direction.

The main reason that alternate rows of spiral wires spiral in opposite senses is to prevent the assembled woven wire belting from tending to "walk" leftwards or rightwards as it runs in a longitudinal direction entrained about various driving, idling and tensioning rolls. The tendency of one row to cause the belt to walk to the left is immediately countered by the tendency of the succeeding row to cause the belt to walk to the right with the net effect that the belt tends to run essentially longitudinally.

The spiral wires are conventionally termed "flat spirals", because, looking at them endwise, they are not circular ring-shaped, but oval ring-shaped, because they have been "squashed" in a top-to-bottom thickness sense, so that each spiral is wider (in the lengthwise direction of the conveyor belt), than it is tall (in the thicknesswise direction of the conveyor belt).

Woven wire conveyor belts have been around for many years, likely for more years than anyone now working in the field. Early on, it was discovered that the performance of woven wire conveyor belting could be improved by "crimping" the connecting rods, i.e., causing them to be regularly undulatory along their lengths, so that individual coils of the spiral wires tended to seat, and to remain seated in respective individual dents, crimps, recesses or pockets in the crimp rods.

An ingenious way of creating the crimps in the connecting rods, discovered long ago, was to run the rods, during their manufacture, straight through the nip between two meshing gears that were made of harder more durable material than the rods, so that the rods came out looking something like a piece of gum does after it has been squashed between a person's back teeth. In the earliest examples of crimped connecting rod-type woven wire belting, the spiral wires individually have circular transverse cross-sectional figures (profiles) and the crimps in the crimp rods are "straight", i.e., precisely crosswise (i.e., essentially transversally) of the crimp rods. (In the industry, crimped connecting rods often are called "crimp rods".) This product is a definite improvement over flat spiral woven round wire conveyor belts with non-crimped rods, because the spiral turns do in fact seat in the crimp pockets on the rods. In fact, this form of construction has become an industry standard. It is believed that in somewhat over half of all woven wire conveyor belting sold these days, the flat spirals are made of round wire, and the connecting rods have straight crimps.

However, since each spiral turn passes around a respective connecting rod at an oblique angle, and the crimp notch is straight, only a limited-area point contact is formed between the spiral wire and the crimp rod. This results in a less-than-perfect seating of each spiral turn against the respective crimp rod and leads to significant (and undesirable) longitudinal stretching of the endless conveyor belt, particularly when the belt is used in high temperature and heavy load applications. (When a belt stretches, the excess length must be taken out, or taken up by using adjustable belt-tensioning means, so that neither the carrying run nor the return run will sag excessively. Excess belt length, not removed or properly taken up, can cause operating problems, including improper tracking of the belt on and around driving, idling and tensioning rolls.)

A major improvement in the conventional round wire/straight crimp woven wire belting was made by Fred Hooper, an employee of The Cambridge Wire Cloth Company, back in the 1950's. In that development, which is disclosed in U.S. Pat. No. 2,885,164, issued May 5, 1959, the transverse cross-sections of the flat spiral wires remained circular as before, but the connecting rods were run through slant-toothed gears during their manufacture, so that the crimp notches formed in alternately diametrically opposed sites on the crimp rods were oblique to the longitudinal axis of the crimp rods, with the angle of obliqueness of the crimps equalling the angle of spiraling of the coils of the spiral. The area of interfacial (i.e., superficial) contact between the spiral turns and the crimp rods was thereby substantially increased. As a result, such woven wire belts provide better seating of the spiral wires in the crimp notches, leading to straighter belt tracking and reduced belt stretch despite high temperature use (i.e., for use as product supports in continuous operations through tunnel-type baking and heat-treating ovens), during which the belts may be strongly tensioned in order to minimize product tipping and unwanted contact of the belt with nearby structures. This type of round wire/diagonal crimp woven wire conveyor belt has captured a significant segment of the market because of its superiority in relation to the theretofore conventional round wire/straight crimp woven wire conveyor belt. Nevertheless, it was not and is not considered to be a perfect solution. Two characteristics that this product has are sometimes considered to be unacceptable (or at least undesirable problems). These are, respectively, product-stability, and product-marking problems. Because conveyor belts made of the flat spirals nevertheless have many rounded upwardly presented profiles of individual spiral turns in their carrying runs, products, particularly ones that are tall and thin in their as-carried orientation, such as empty beverage can bodies, nail polish bottles and the like, are susceptible to tipping over, particularly if there is any jerkiness in the running of the belt. A domino effect can cause many items of the carried product to topple over when one does.

Now, imagine what it feels like to walk on a high wire in your bare feet. Totally aside from the fear factor, it's uncomfortable, because the wire tends to bite into the soles of your feet. That effect is partly due to the shape of the interfacial (superficial) contact between your foot and the wire, and partly due to the smallness of the area of the wire that must support all of your weight. A way of alleviating the pain immediately suggests itself (i.e., apart from not walking on the wire). The solution is to flatten the wire, so that the surface that it presents to the soles of your feet is both broader and flat.

Precisely this same sort of problem occurs in the transporting of certain products using woven wire conveyor belts, and heretofore, it has been solved in precisely the same way.

An example of the types of products that have been adversely affected by the impact of their weight on round wire profiles while being carried on woven wire conveyor belts are: individual blobs of cookie dough, chocolate-enrobed candy bars and similar products, and lehr-tempered beer bottles and similar products, in which the contact with the belting caused unacceptable (or at least undesirable) markings and distortions on the undersides of the individual product items.

A response to the product-indentation problem, was the invention of flat spiral woven wire conveyor belting in which the spiral wires were manufactured using "half-round" or "cotter-pin" wire of generally D-shaped transverse cross-sectional profile, oriented in the conveyor belt so that the flat side, the facet of the "D" was oriented vertically upwards in the carrying run of the belt.

In the half-round wire belts heretofore made (within the knowledge of the present inventors), the crimp rods all have had straight crimps, rather than diagonal crimps. Therefore, whereas a flatter surface was provided on the carrying run of the belt, for greater product stability and less product marking, the point contact of the spirals with the crimp notches gave the same disadvantages as the pre-Hooper product, i.e., they are oriented excessive stretch in high temperature and heavy load applications.

A further development was flat wire/flat straight crimp flat spiral woven wire conveyor belting, in which the spiral wires rather than being D-shaped in transverse cross-sectional shape, have two diametrically opposed facets, with intervening convexly profiled surface segments. Whereas the spiral wires in this known modification were easy to manufacture, and easier to keep properly oriented while being wound into spiral form, the flat crimp profile on the connecting rods saddled the resulting product with substantially the same excessive stretch problem as the original round wire/straight crimp product had.

It is possible that regular flat wire belting (flat both sides) was developed before cotter pin wire. At any rate, to the present inventors' knowledge, cotter pin wire has never been widely used in conveyor belts. Its use, as far as the present inventors know, has been restricted to wide, open mesh veneer belts, which are used for carrying wood panels through drying ovens.

In a further prior art development, the flat wire concept was successfully teamed up with the diagonal crimp concept, to provide a flat spiral, woven wire conveyor belt in which the crimp notches on the connecting rods, were flat and extended at oblique angles to the longitudinal axes of the connecting rods that precisely matched the angle and profile of the individual spiral turns of the spiral wires. This also was an improvement over the prior art, but still not a perfect solution. A remaining problem with this product is difficult to illustrate in a two-dimensional drawing, so the inventors must beg the indulgence of their interested readers in trying to visualize it:

As one tries to match each interface of the spiral wires more closely with the crimped connecting rods, a gap exists between the middle of each crimp notch and the middle of the turn of the spiral of the flat wire passing around it. The essential concept is something like a non-flat-footed person walking barefoot on a concrete floor. Their foot tends t make contact with the floor towards the front of their foot (i.e., their toes and the ball of their foot), and towards the rear of their foot (i.e., their heel), but not in the middle (i.e., their arch). On the belt, the flat on the wire, arching through the flat diagonal crimp notch tends to contact only at the two edges of the crimp notch and not in the middle. As a result, whereas the spiral wires are well seated in the crimp notches, use of the belt causes the crimp rods to rapidly become worn at the leading and trailing edges of the individual crimp notches, causing not only belt slackness that needs to be taken up, but also an early reduction in the cross-sectional area of the connecting rods available for carrying belt tension. Accordingly, the tensile load-carrying capacity of the belt can become diminished (compared to design or theoretical tensile load-carrying capacity) fairly early in the working life of the belt.

Currently, according to the belief of the present inventors, there is a substantial market demand for flattened wire conveyor belting that did not exist when the Hooper patent was taken out. Flat wire/flat diagonal crimp woven wire belt has been produced to try to meet this market demand, but, as indicated above, the interfacial gap caused by arching of flat over flat (has caused some customers or potential customers for this product to perceive it) as not being as good as the round wire/diagonal crimp product made in accordance with the Hooper patent. (Round wire passing through a flat diagonal crimp notch also arches free of contact with the middle of the notch, however to a significantly lesser degree, so that there is a significantly greater area of interfacial contact between the spiral wires and the connecting rods within the individual crimp notches of a well-designed, well-manufactured Hooper-type round wire/flat diagonal crimp woven wire conveyor belt, than within the crimp notches of a comparable flat wire/flat diagonal crimp woven wire conveyor belt.)

SUMMARY OF THE INVENTION

Round wire or rod stock for connecting rods is run through the nip of a pair of obliquely toothed rolls having teeth which taper from one face of the roll towards the other, and have a larger radius at the tip than along the portions flanking the tip. The angle of obliqueness matches the angle that a turn of a spiral wire will traverse the connecting rod. The teeth do not taper in thickness. They are uniform across the roll. The diameter of the roll is smaller on one side than on the other. Round wire stock for the single-faceted spiral wires is run through the nip of a pair of rolls one of which has a cylindrical surface (i.e., a flat longitudinal profile), and the other of which has a circumferential groove with a slightly larger diameter than the round wire stock. As the wire is flattened on one side, its curved side is broadened. As the resultingly single-faceted round wire is wound into flattened spiral form, it is spatially orientationally guided, so that the facet becomes located facing outwards. The rods and flat spirals are conventionally assembled with one another and secured to one another at respective ends, to provide a balanced flat spiral woven wire conveyor belt with rounds of turns nested in concave oblique crimp notches on the connecting rods.

The principles of the invention will be further discussed with reference to the drawings wherein preferred embodiments are shown. The specifics illustrated in the drawings are intended to exemplify, rather than limit, aspects of the invention as defined in the claims.

DETAILED DESCRIPTION

Figure 1:
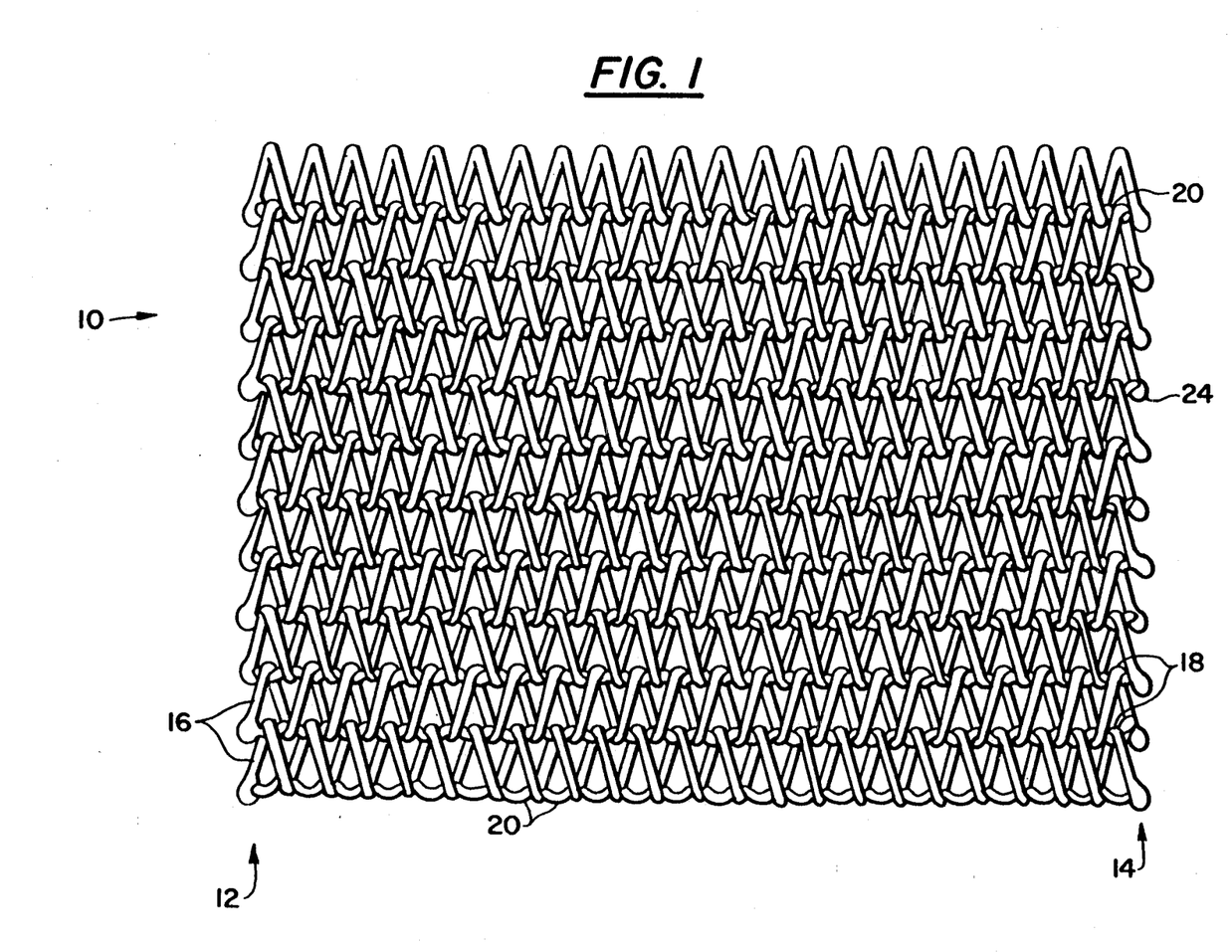
FIG. 1 is a top plan view of a swatch of balance flat spiral woven wire conveyor belt of a type which may include improvements provided in accordance with the principles of the present invention.
Figure 2:
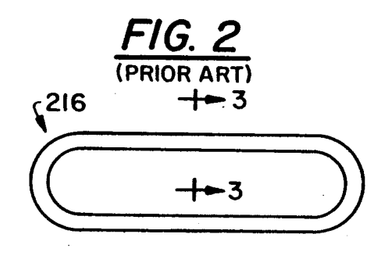
FIGS. 2, 3, 4, 5, 6 and 7 are, respectively, a small-scale, end elevational view of a flat spiral wire, a transverse cross-sectional view (on a larger scale) of the flat wire used in making the flat spiral of FIG. 2, a fragmentary top plan view of a straight crimp connecting rod, a fragmentary side elevation view of the straight crimp connecting rod of FIG. 4, a fragmentary side elevational view of one turn of the flat spiral wire of FIGS. 2 and 3 as nested in one straight crimp notch of the rod of FIGS. 4 and 5, when a belt such as is shown in FIG. 1, made of these wires and rods, is new; and a fragmentary top plan view of the same wire/rod interface region of the same belt.
Figure 3:
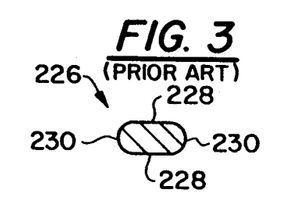
Figures 4, 5:
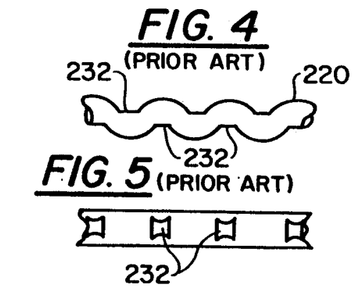
Figure 8:
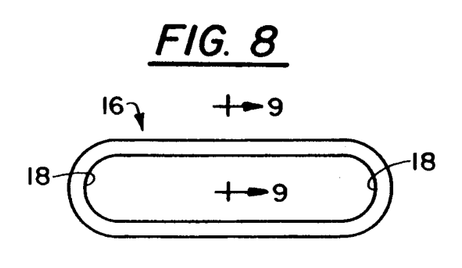
FIGS. 8-13 are views respectively comparable to FIGS. 2-7, but of a product made in accordance with the principles of the present invention.
Figure 9:
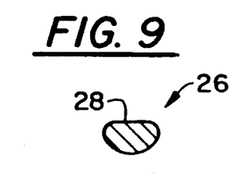
Figure 10:
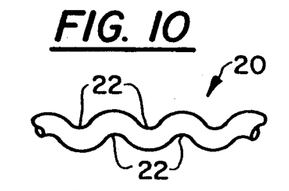
Figure 11:
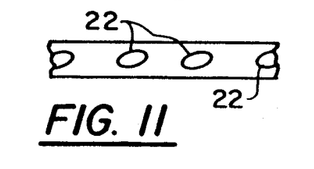
Figure 12:
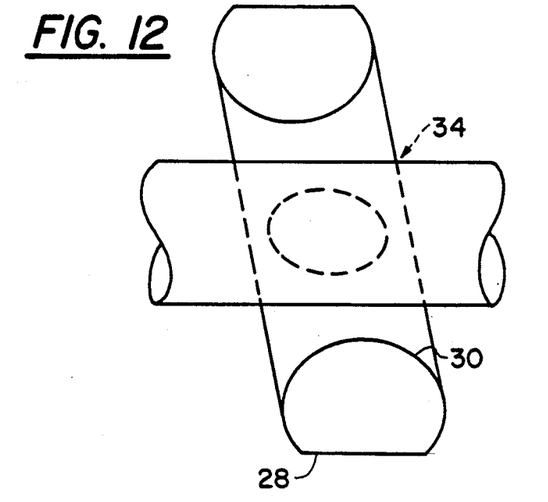
Figure 13:
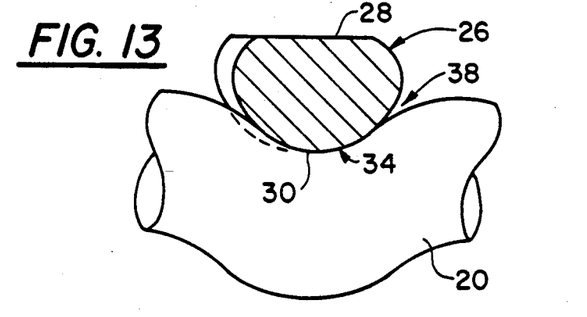

Unavoidably, some confusion will result from reading the explanation provided herein due to the fact that the terms "flat" or "flattened" are used in two different ways to mean two different things. First, both conventionally, and in accordance with the present invention, each spiral wire unit of the conveyor belt of FIG. 1 is flat or flattened, in the sense that it is oval in end view, see FIGS. 2 and 8, so it is less thick (shorter, thicknesswise of the belt) than it is wide (lengthwise of the belt). Second, the originally round wire stock, which is spirally wound to make the spiral unit of FIG. 8, is first "squashed" between a flat profiled roll and a grooved profiled roll, so that it becomes single faceted (flat topped-round bottomed).

The wire stock used to make the product of the present invention, the machinery on which the wire-forming and rod-crimping rolls are mounted, and (but for the orientation device of FIG. 17) the apparatus used for cutting into stock lengths and assembling into belting the wires and rods of the present invention may be utterly convention, e.g., as long used for the conventional manufacture of balanced flat spiral woven wire conveyor belting of The Cambridge Wire Cloth Company, of Cambridge, Md., U.S.A. A commonly used stock for the wire and rod is three percent chrome steel wire. However, virtually any stock conventionally used in the manufacture of belting such as shown in FIG. 1 (including those disclosed in the current catalog of The Cambridge Wire Cloth Company) can be used.

Referring to FIG. 1, a balanced flat spiral woven wire conveyor belt is depicted at 10. The belt 10 has laterally (transversally) opposite, i.e., left and right, longitudinally extending edges 12, 14, and is of indeterminate length in the longitudinal direction (parallel to the edges 12, 14). The belt 10 is composed of a longitudinally extending series of transversally extending flat spiral wire units 16, alternate ones of which spiral in a left-handed sense and a right-handed sense. Spiral turns 18 of the units 16 turn around respective connecting rods 20, in respective crimp notches 22 in the rods 20. The notches 22 face upstream and downstream, in the plane of the conveyor belt. The notches extend on axes which are not perpendicular to the plane of the conveyor belt. Rather, on alternate ones of the rods 20, they are tilted to the left, and tilted to the right. On each rod, the notches 22 are provided on two series, one opening towards upstream, and another, diametrically opposed set, opening towards downstream. On each rod, the notches 22 of the two sets are staggered, one on one side being located half-way between two on the other side, but all are tilted in the same direction, i.e., all towards the left on both sides of one rod, and all towards the right on both sides of the next rod.

Accordingly, spiral units 16 of opposite hand need to be wound in opposite directions, whereas crimp rods 20 can be manufactured as one type and simply alternately turned side to side in order to provide the two types needed.

In the embodiment shown, the assembled belting 10 is maintained fastened together by welding ends of spiral units to respective ends of crimp rods as illustrated at 24. Other connecting means such as are conventionally used for fastening woven wire conveyor belting together can be used for the same purpose in the product of the present invention.

Typically, both the spiral wire units 16 and crimp rods 20 are manufactured from indeterminate lengths of steel wire material acquired as coils, and is not cut to length until after it has been provided with the novel shapes disclosed herein.

Digressing briefly, the components of a test belt 210 made in accordance with teachings of the prior art, are illustrated in FIGS. 2-7. This belt has the same overall appearance as is illustrated in FIG. 1. However, in detail, this belt is a flat wire/straight crimp belt, i.e., its spiral wire units 216 (FIG. 2) are made from wire 226 (FIG. 3) that has two diametrically opposed flat facets 228 joined by two convexly cylindrically curved segments 230 of outer surface. The connecting rods 220 were formed by running initially round wire stock in the nip between two straight-toothed, gear-like wheels with flat-ended teeth, so as to produce alternate side-facing pocket-like crimp notches 232 in the crimp rods 220. These notches 232 are rectangular-bordered features having two sides that extend transversally of the longitudinal axis of the rod and two sides that extend parallel to the longitudinal axis of the rod. See FIGS. 4 and 5.

Figure 6:
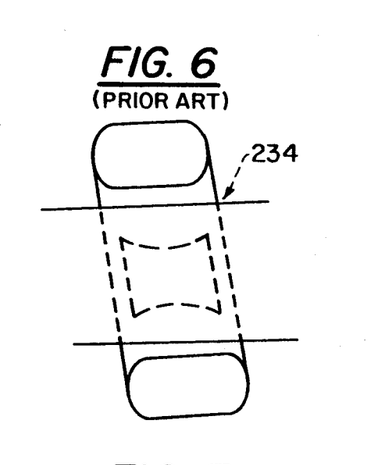
Figure 7:
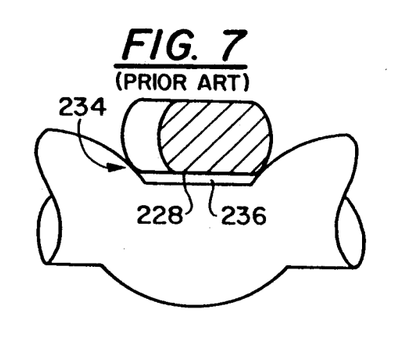

As the two-faceted flat wire flat-spiral units 216 are conventionally assembled with the straight crimped rods 220 to form a conveyor belt 210 similar in overall appearance to the belt 10 shown in FIG. 1, the wires 216 and rods 220 typically have the interfacial (superficial) relationship at the turn/notch interfaces 234, such as is illustrated in FIGS. 6 and 7. Note in particular that, prior to the conducting of an initial running-in period and some actual usage, there is a gap 236 between the flat facet 228 which lines the interface, and the floor of the notch 232 (because one crosses the other in an X-like pattern and the notches 232 are not long enough, longitudinally of the rod, to fully accommodate the obliquely extending respective turn 218 of the spiral unit 216.

This initial mismatch results in excessive wear on the interfacial surfaces during running in and initial use of the conveyor belt 210, and is an undesirable characteristic of the conventional product, that use of the principles of the present invention is meant to eliminate.

In the product 10 of the present invention, the spiral wire units 16 are flat spirals (i.e., are of oval profile as seen in end view, as shown in FIG. 8, with a greater width than thickness), but the transverse cross-sectional shape of the wire 26 is single flat faceted/round backed, so as to have a flat top facet 28 having its angularly opposite ends joined by a rounded back surface 30. Inasmuch as the wire 26 is formed by squashing initially circular cross-sectioned wire stock between the cylindrical perimeter 40 (FIGS. 15 and 16) of one forming wheel 42 and a U-shaped circumferential groove 44 (i.e., female die), formed in the cylindrical perimeter 46 of another forming wheel 48.

Figure 15:
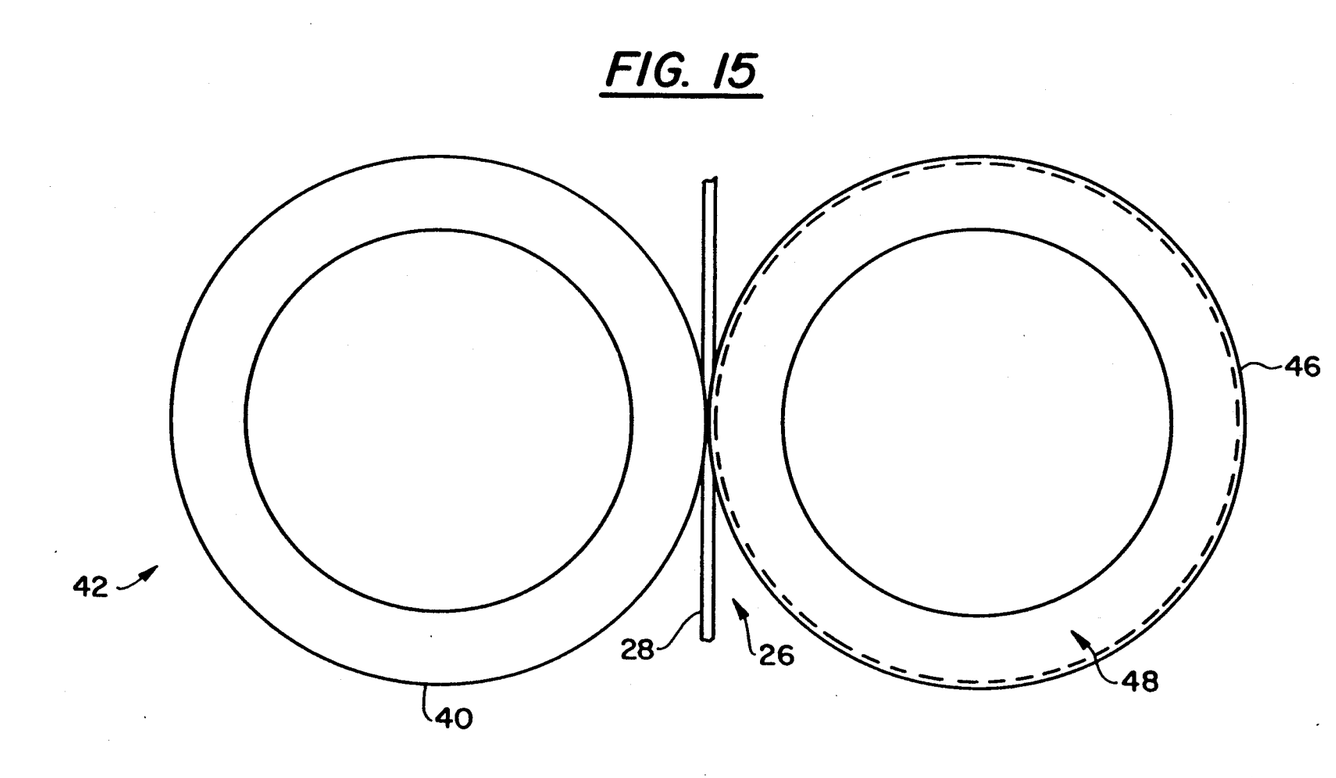
FIG. 15 is a side elevation view of a set of rolls for producing the single-faceted round wire for use in making the flat spiral wires of the product of FIGS. 1 and 12-14 showing a wire being pulled therebetween, for forming the wire.
Figure 16:
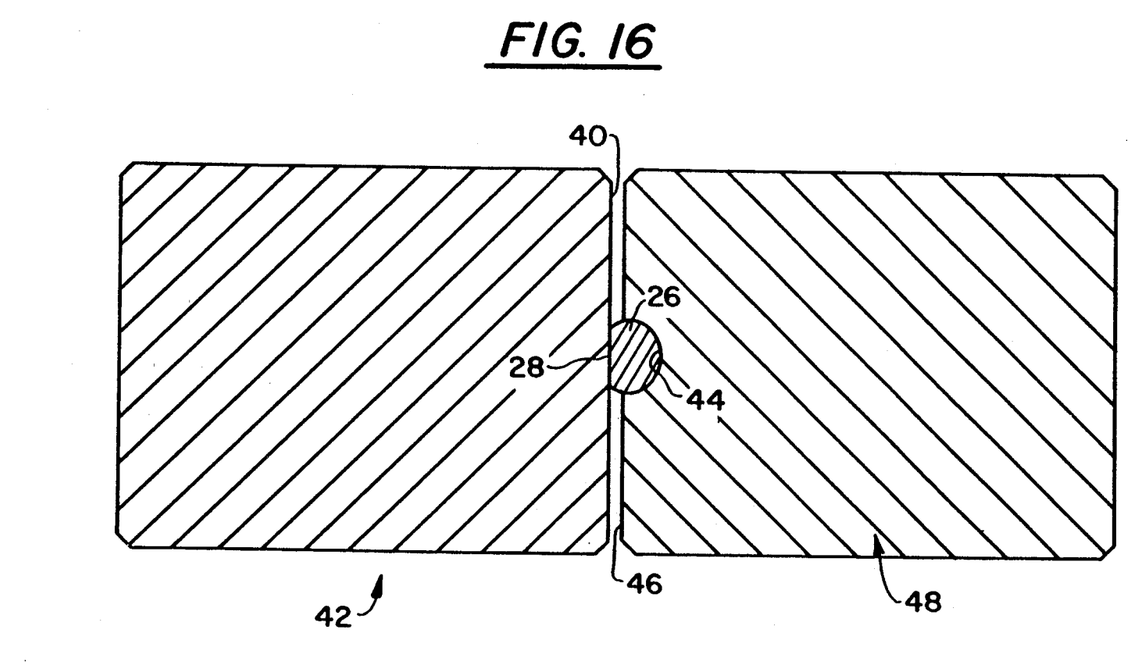
FIG. 16 is a larger scale transverse cross-sectional view of one radial portion of the rolls of FIG. 15, showing a wire of originally circular transverse cross-section being flattened on one side and broadened by being pulled in the groove through the nip between the cylindrical and grooved roll pair of FIG. 15.

The groove 44, though preferably substantially semi-circular in transverse cross-sectional shape, is of a slightly larger radius than the wire stock, and the wheels 42, 48 are counter-rotated, as the wire stock is pulled in the nip between them, seated in the groove 44, with the wheel surfaces 40, 46 sufficiently close together that not only is the wire stock flattened on one side to provide the facet 28, but also is spread out widthwise, so that the curved segment 30 is no longer circularly curved in transverse cross-sectional shape, but is generally oval-shaped, with a transverse axis running parallel to the facet 28.

Figure 17:
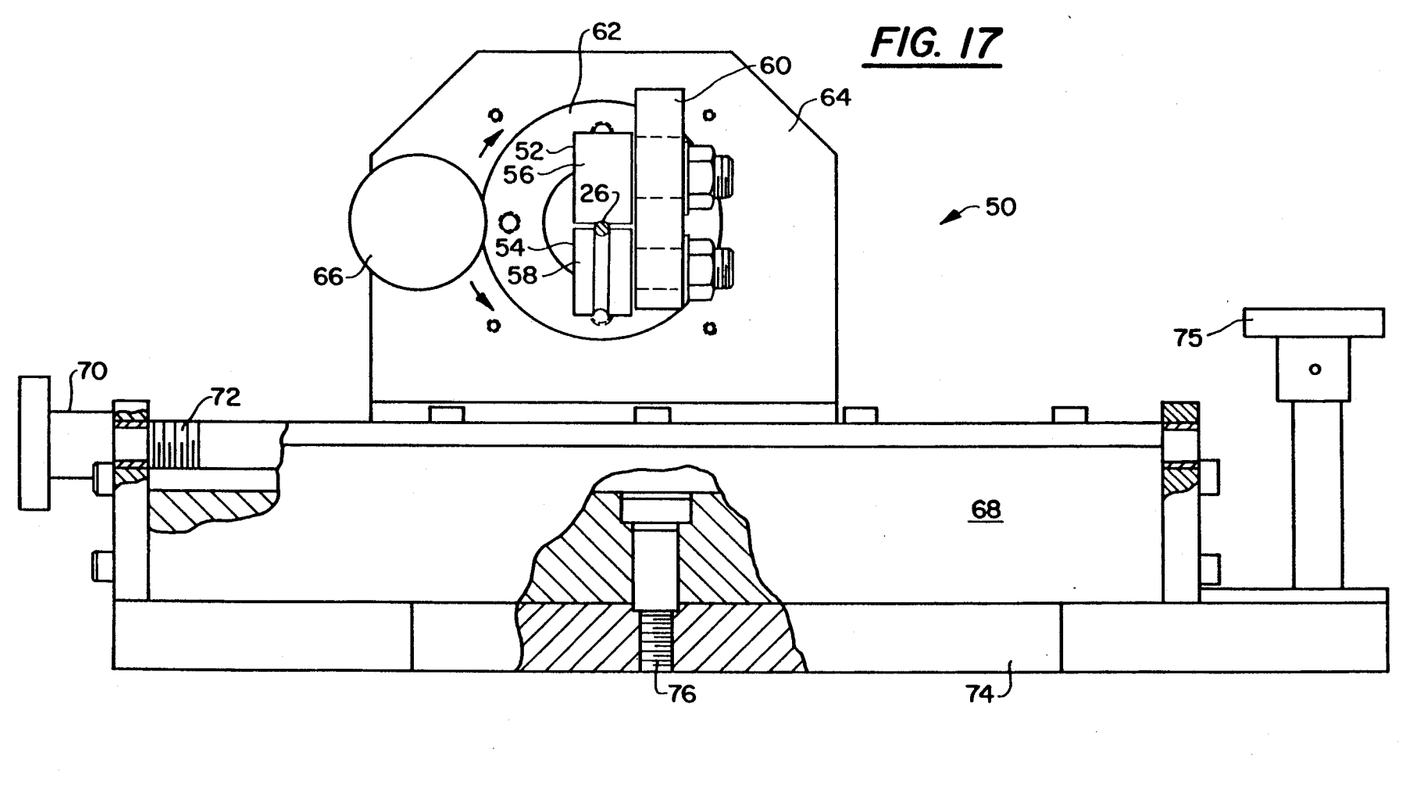
FIG. 17 is a side elevation view (partly broken away and sectioned) of a wire-orientation device, for feeding a single-faceted round wire of FIGS. 9, 12-14, 15 and 16 (and also shown in small scale in this view) into a conventional wire flat spiral winder (not shown) for winding the product of FIG. 9 into the flat spiral form shown in FIGS. 1, 9, 12, 13 and 14, the non-shown conventional winder (in practice) being located to the rear of the device which is shown in this view.

The wire 26 after being run between the forming wheels 42, 48 could be simply fed into the inlet of conventional apparatus for winding the wire 26 into flat spirals. However, without taking precautions to maintain the angular orientation of the wire 26 relative to the inlet of the winding apparatus, the wire 26 would tend to more or less randomly rotate much as does a garden hose being wound into a coil, so that in longitudinally successive increments of the flat coil, the flat facet 28 would not reliably face upwards on the top of the flat coil. Instead, in some places, it would face upwards, in other places, sideways, and in other places, inwards. Not only would the upper surface of the flat coil therefore be irregular, but the interfacial surface 38 of each turn 18 would be of variable shape and position. In order to prevent the occurrence of this highly undesirable characteristic, the present invention provides a wire-orienting device 50 that is shown in FIG. 17.

The wire-orienting device 50 is shown including a pair of wheels 52, 54 having flat and grooved running surfaces 56, 58 and positioning similar to the wheels 42, 48 used for profiling the wire stock. However, in the present instance, the device 50 is not meant to further deform the wire, but only to maintain its angular orientation relative to the inlet of the conventional winder (not shown), so that the spiral wire units 16 are formed with uniform orientation of the wire. To that end, the wheels 52, 54 are mounted for rotation about their own, parallel longitudinal axes, to a first bearing and mounting block 60 which is fixed on a rotary plate 62. The plate 62 is journalled for rotation angularly about the longitudinal axis of the wire passing through the nip of the wheels 52, 54, in a second bearing and mounting block 64. A first adjuster 66 is provided to be turned, e.g., manually, for rotationally adjusting the position of the first mounting block 60 relative to the second mounting block 64. The second mounting block 64 is, in turn, mounted on a horizontal table 68 by means including an adjuster 70 which, when turned (e.g., manually) shifts the second mounting block leftwards and rightwards (i.e., horizontally, transversally of the longitudinal axis of the wire along a transverse horizontal axis of the adjustment screw 72). The horizontal table 68 is, in turn, mounted on a fixed base 74, by means including an adjuster 75 which, when turned (e.g., manually), rotates the horizontal table 68 about a vertical axis (of the adjustment screw 76). Simply put, the device provides means for spatially adjusting the wire entering the winder about two mutually orthogonal transverse axes (i.e., an X-axis and a Y-axis), as well as in an angular (i.e., circumferential) direction relative to the longitudinal axis of the wire. By using the device 50 in a monitoring sense, a winding machine operator can ensure that the flat spiral wire units are uniformly manufactured, and have a uniform spatial orientation of their single facet 28 and rounded back 30.

Figure 18:
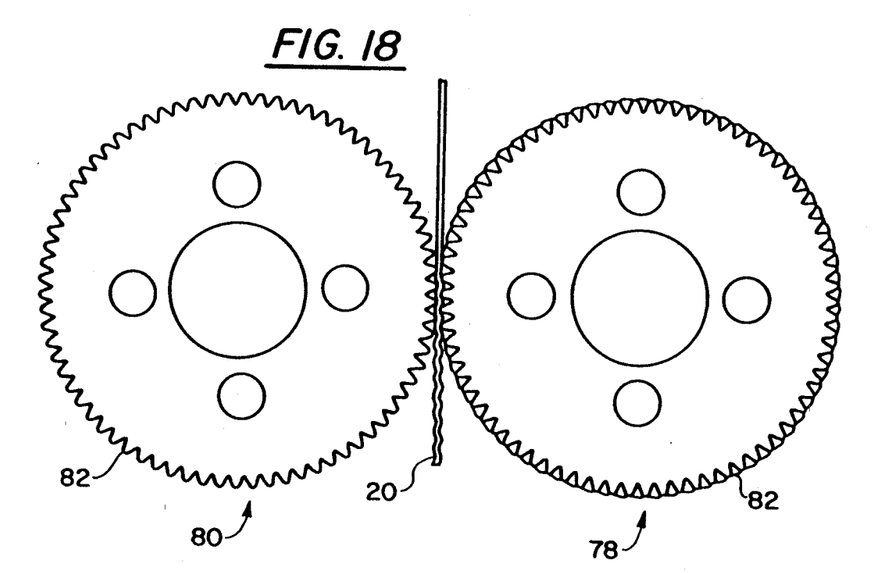
FIG. 18 is a side elevation view of a pair of crimp wheels for providing rod stock (shown), with oblique concave crimp notches for providing the connecting rods of FIGS. 1, 10, 11 and 12-14.
Figure 19:
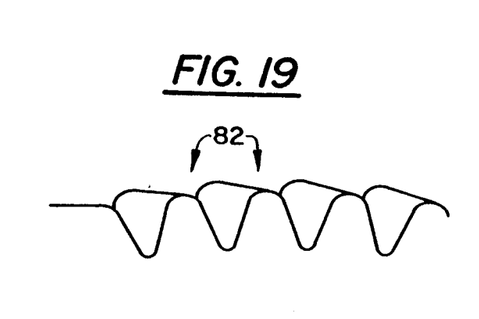
FIG. 19 is a larger scale fragmentary side elevation view of one of the crimp rolls of FIG. 18, showing the obliqueness and profile of the teeth.
Figure 20:
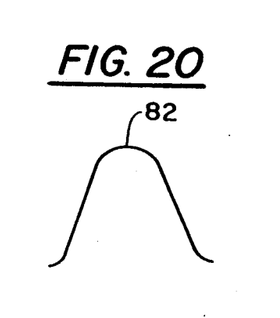
FIG. 20 is an enlarged end view of one tooth of the one of the crimp wheels of FIGS. 18 and 19, showing the multi-radii shape of the tooth-tip profile.

The initially circularly transverse cross-sectioned wire stock for making the connecting rods 20 is caused to have the novel obliquely oriented, concave crimp notches alternately in two diametrically opposite sides thereof by running it in the nip between two counter-rotated gear-like forming wheels 78, 80 (FIG. 18-20). The outer perimeters of the wheels 78, 80 are provided with radially outwardly projecting teeth 82 which are slanted with respect to the longitudinal axes of the respective wheels. The angle of tooth slant across the width of the respective gear substantially matches the angle at which the respective wire turn 18 will cross the respective connecting rod 20 at the respective turn-/notch interface 34 in the finished product 10. (Typically, each wheel has a diameter of approximately eight inches, a series of seventy-four teeth 82 cut with a mandrel angle of 1° 8' and a table angle of 8°, with each tooth having a blunt, rounded tip that has a radius of 0.078 inches right at the tip, and 0.063 inches in two portions which border the tip. The radius of the valley between two teeth in this example is 0.0156 inch.) Each toothed wheel 78, 80 is typically about two inches thick, and the wheels are run with a nip relatively the size indicated in FIG. 18, so as to slightly serpentinize the rod stock passing therethrough while alternately denting (notching) two of its opposite sides to thereby provide the desired crimp notches 22 therein.

Figure 14:
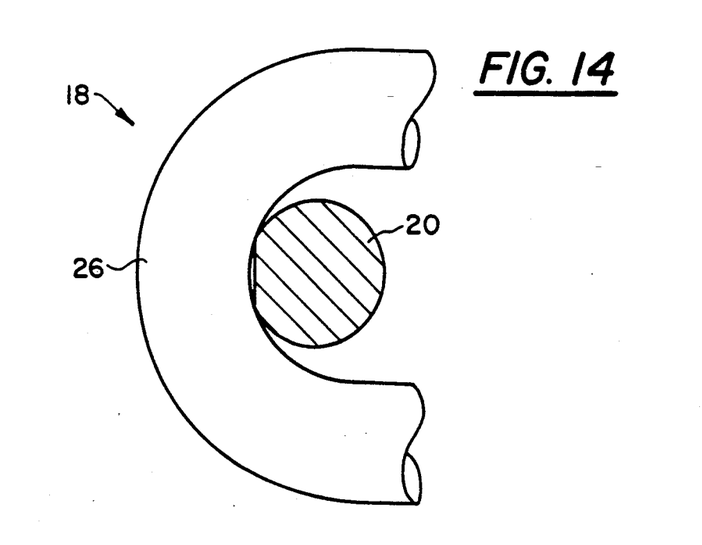
FIG. 14 is a further view of the product of FIGS. 12 and 13 further illustrating the round of a turn of the spiral nesting in the concave oblique crimp notch on the connecting rod.

As the flat spiral units 16 are assembled with the crimp rods 20 and secured to produce the conveyor belt 10 shown in FIG. 1, the interfacial surfaces 38 of the turns 18 of the flat spiral wire units 16 intimately contact the floors of the crimp notches 32 (FIG. 14) so that there are no gaps (such as the initial gaps 236 in the conventional product, FIGS. 6 and 7).

As indicated above, test belting made of the conventional product of FIGS. 2-7 and of the novel product of FIGS. 8-14 have been made and tested by or at the direction of the present inventors.

The conventional product, which appeared as indicated in FIGS. 2-7, simulated the appearance, structure and material of a product that is presently commercially available. The novel product, which appeared as indicated in FIGS. 8-14 was made of wire and rod having the same constituency and treatment. The novel product was made using the exemplary apparatus described hereinabove.

Some physical characteristics of the two test products are provided in the following table. Dimensions are inches, unless otherwise indicated.

TABLE 1

|  | Conventional | Novel |
| --- | --- | --- |
| Wire Composition | 3% chrome | 3% chrome |
| Wire Thickness | 0.084 | 0.083 |
| Wire Width | 0.113 | 0.116 |
| Facet Width | 0.063 | 0.080 |
| Spiral Thickness | 0.335 | 0.358 |
| Spiral Width | 0.842 | 0.838 |
| Crimp Rod Width (outside to outside) | 0.145 | 0.136 |
| Crimp Notch Length | 0.078 | 0.102 |
| Crimp Notch Width | 0.055 | 0.060 |
| Crimp Notch Angle | 0° | 8.04° |
| Crimp Notch Depth | 0.045 | 0.036 |
| Crimp Notch Floor | Flat | Concave |
| Belt Mesh Count | B-36-20-12 | B-36-20-12 |

TABLE 1-continued

|  | Conventional | Novel |
| --- | --- | --- |
| Belt Width | 12 | 12 |

Figure 21:
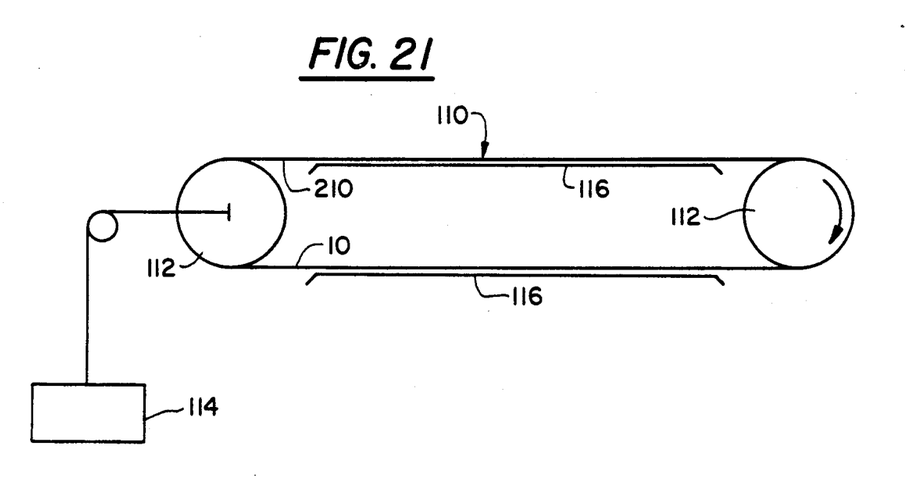
FIG. 21 is a schematic side elevation view of a test conveyor for comparatively testing a conveyor belt of the type shown in FIG. 1, made conventionally according to the flat wire/straight crimp technology that is disclosed herein with reference to FIGS. 2-7, and a conveyor belt of the type shown in FIG. 1, but made in accordance with the principles of the present invention as disclosed herein with reference to FIGS. 8-20.

The test endless conveyor belt 110 shown in FIG. 21 was made by connecting two lengths of belting head to tail, one length being the conventional product, and the other being a length of the novel product (in order to ensure that both samples were subjected to substantially identical running conditions). Each sample constituted approximately one-half of the full length of the test belt 110. The belt 110 was driven using two six-inch diameter friction rolls 112, respectively, at the drive and tail ends of the conveyor. A take-up means was provided in the form of a live counterweight take-up 114 providing one hundred fifty-six pounds of counterweight. The belt 110 was driven at 200 linear feet per minute, over a slider bed 116 made of ultrahigh molecular weight polyethylene. The total belt length was 17.51 feet, initially, so that, at 200 feet per minute, the belt made approximately 686 complete revolutions per hour. A gauge length of one hundred thirteen pitches was established and measured on each of the two belt lengths prior to running. Each belt length was thoroughly degreased prior to conducting the test running, so that wear would occur rapidly (i.e., the test was an accelerated wear test). The belt tension provided by the counterweight 114 was seventy-eight pounds.

The testing period was 108.5 hours. During the test, five gauge length measurements were taken (most measurements were taken at approximately 24-hour intervals). At 15 hours, 38.5 hours, and 84.4 hours, sample spirals and crimp rods were removed from each belt for examination. By the end of the test, the belt 110 had made over 74,000 revolutions.

Figure 22:
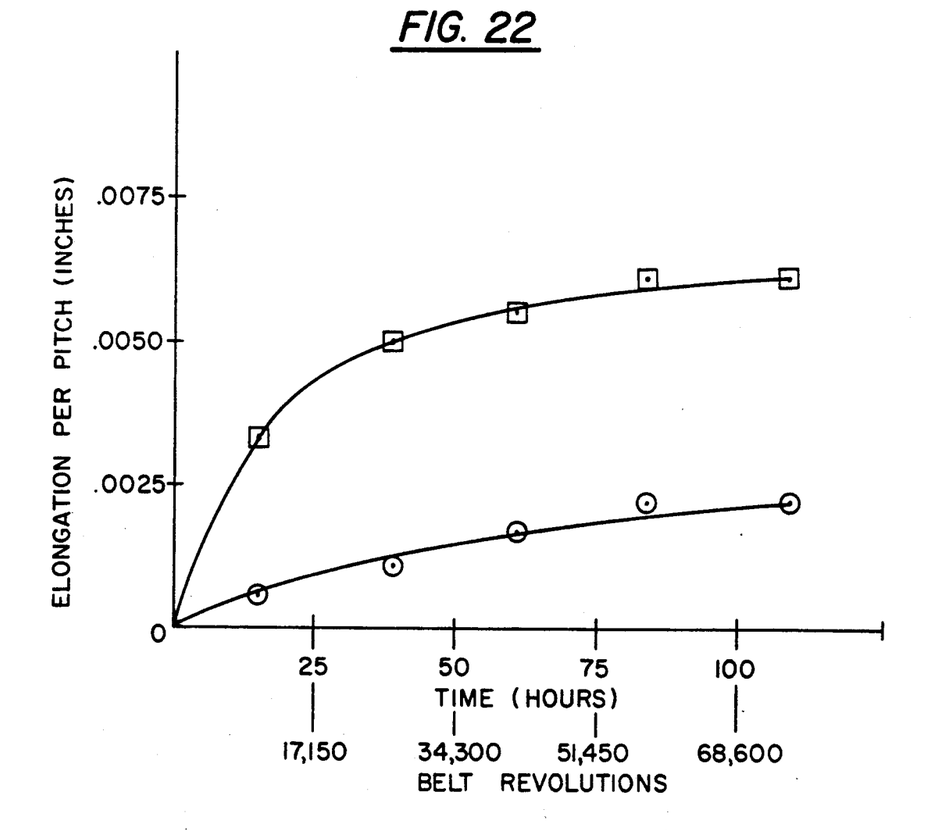
FIG. 22 is a plot of elongation per pitch versus time (and number of belt revolutions) showing a comparison of accelerated wear test results for the conventional double-faceted flattened wire/straight crimp belt of the prior art, and the single faceted round backed wire/oblique concave crimp connecting rod belt of the present invention.

According to the results of the test, the flattened wire belt 210 elongated at a significantly faster rate than the flat top round back/oblique crimp belt 10. As can be seen on the graph of test results in FIG. 22, the conventional flattened wire belt 210 elongated rapidly for the first 60 hours, then the rate of elongation slowed down. The novel flat top belt 10 elongated at a slow and relatively even rate for the duration of the test. Overall, the conventional flattened wire belt elongated 0.0039 inch more per pitch than the novel flat top belt. That is a difference of 177.3 percent.

Dimensional analysis showed the spirals of both belts to be virtually unchanged in pitch and thickness after the test. That indicates that all the elongation observed during the test was due to wear.

Figure 23:
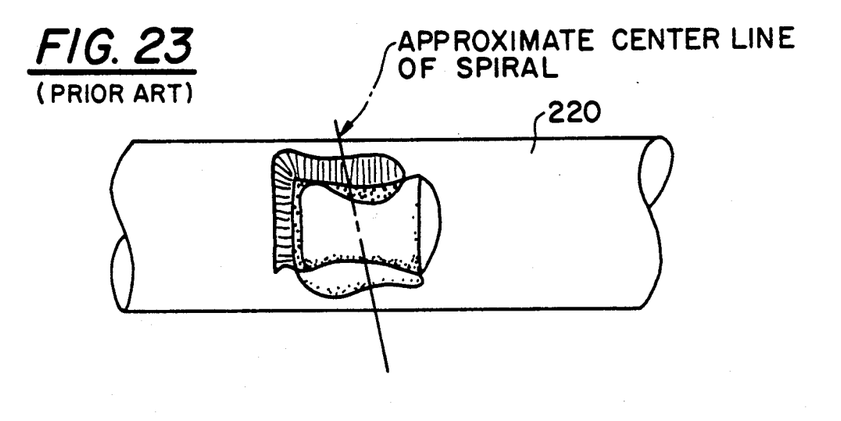
FIG. 23 illustrates wear at a crimp notch, on the conventional crimp rod used in the test reported in FIG. 22.
Figure 24:
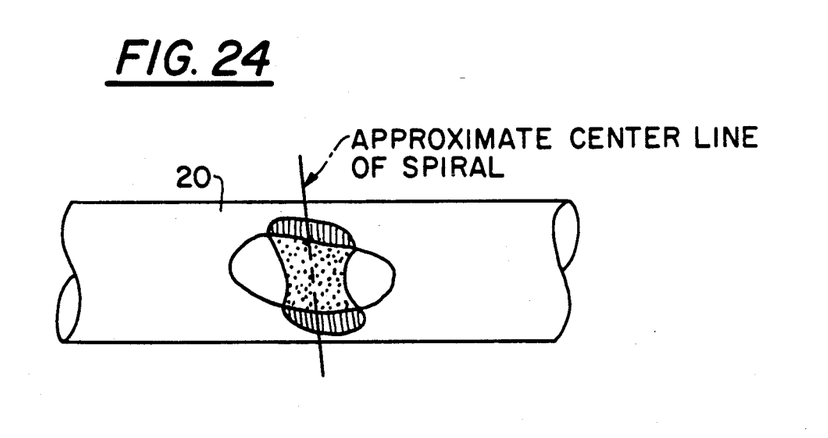
FIG. 24 illustrates (for comparison with FIG. 23) wear at a crimp notch, on the novel crimp rod used in the test reported in FIG. 22.

Microscopic examination of the crimp rods showed that the wear on the flattened wire crimp rod 220 took place mostly outside of the crimp notch. This happens primarily because the crimp notch is straight and does not match the helix angle of the spiral. This condition may also be somewhat aggravated by the extreme thinness of the two-faceted flat wire flattened wire spiral 216. This combination of straight crimp and thin spiral causes the spiral to make initial contact only along the sides of the crimp. As the belt runs, this small area of contact wears rapidly and the belt elongates rapidly until the spiral begins to seat properly from wearing in. The resulting wear is indicated in FIG. 23. In contrast, the crimp rod 20 of the flat top, oblique crimp belt 10 has a relatively small percentage of its total wear surface outside the crimp notch area. This is due to the crimp notch being elongated and oriented on the same helix angle as the spiral. The round back flat top spiral has a large interfacial surface in contact with the oblique crimp notch, which does not wear rapidly. Since proper seating between crimp rod round back and spiral notch is built into the flat top belt 10, initial "break-in" elongation is drastically reduced. Compare FIGS. 23 and 24.

From the test results, the inventors have concluded that the novel flat top/oblique crimp belt 10 has superior resistance to elongation due to wear when compared to conventional flattened wire/straight crimp conveyor belting. The combination of the single-faceted, round-back wire and the specially designed oblique crimp in the rod gives the belt 10 an area of contact between the spiral and crimp rod that reduces "break-in" elongation by nearly two-thirds.

It should now be apparent that the single faceted round back wire, oblique crimp connecting rod woven wire conveyor belt as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A balanced flat spiral woven wire conveyor belt, comprising:
   a longitudinally extending series of transversally extending flat spiral wire units, in which each unit is generally oval-shaped in end elevational profile ,being wider than thick. and alternate units in said series spiraling in a left-handed sense and a right-handed sense:
   each said flat spiral wire unit being made of single flat faceted, round-backed wire, wound into the respective unit so that a flat facet thereof faces outwards, and around back thereof faces inwards relative to a respective notional spiral about which said wire spirals, including at leading and trailing turns;
   a longitudinally extending series of transversally extending connecting rods, in which each rod skewers all trailing turns of a respective leading one of said units, and all leading turns of a respective trailing one of said units, so that said leading and trailing turns are maintained in two intercalated series; and
   means securing respective ones of said units, at opposite ends thereof, to respective ones of said rods, at opposite ends thereof;
   each connecting rod being of serpentine form in plan view so as to alternatingly provide in diametrically opposite, leading and trailing sides thereof, a plurality of oblique, concavely curved crimp pockets corresponding in number, spacing and spatial orientation so that a surface portion of each turn of each unit skewered on a respective rod has interfacial contact throughout a generally oval-shaped region with a floor of a respective oblique, concavely curved crimp notch on the respective connecting rod;
   adjoining crimp pockets on the leading side of each connecting rod and adjoining crimp pockets on the trailing side of each connecting rod being spaced from one another, axially of the respective connecting rod by respective distances each of which is longer than each said flat faceted, round-backed wire is wide across the transverse cross-sectional profile of such wire;
   said single flat faceted, round-backed wire having said round back thereof being of oval transverse cross-sectional profile throughout. between opposite ends of said single facet, said oval profile being elongated along an axis which is substantially parallel to said single facet;
   said units and said rods being made of steel; and
   said flat faceted, round-backed wire having a wire thickness to wire width to facet width ratio of about 83:116:80.

2. The balanced flat spiral woven wire conveyor belt of claim 1, wherein:
   said units and said rods are made of three percent chrome steel.

3. The balanced flat spiral woven wire conveyor belt of claim 2, wherein:
   said securing means is constituted by welding.

* * * * *